(12) United States Patent
Tajalli

(10) Patent No.: US 11,894,961 B2
(45) Date of Patent: Feb. 6, 2024

(54) SYNCHRONOUSLY-SWITCHED MULTI-INPUT DEMODULATING COMPARATOR

(71) Applicant: Kandou Labs, S.A., Lausanne (CH)

(72) Inventor: Armin Tajalli, Lausanne (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 18/045,713

(22) Filed: Oct. 11, 2022

(65) Prior Publication Data

US 2023/0062846 A1 Mar. 2, 2023

Related U.S. Application Data

(63) Continuation of application No. 17/367,392, filed on Jul. 4, 2021, now Pat. No. 11,469,931, which is a
(Continued)

(51) Int. Cl.
*H04L 27/20* (2006.01)
*H04L 25/02* (2006.01)
(Continued)

(52) U.S. Cl.
CPC ...... *H04L 27/2071* (2013.01); *H04L 25/0274* (2013.01); *H04L 25/0292* (2013.01);
(Continued)

(58) Field of Classification Search
CPC .............. H04L 27/2071; H04L 25/0274; H04L 25/0292; H04L 25/4919; H04L 27/148;
(Continued)

(56) References Cited

U.S. PATENT DOCUMENTS 3,196,351 A 7/1965 David
3,970,795 A 7/1976 Allen
(Continued)

FOREIGN PATENT DOCUMENTS

CN 1864346 A 11/2006
CN 101854223 A 10/2010
(Continued)

OTHER PUBLICATIONS

International Search Report and Written Opinion of the International Searching Authority for PCT/US18/67994, dated Apr. 3, 2019, 1-10 (10 pages).
(Continued)

*Primary Examiner* — Jean B Corrielus

(57) ABSTRACT

Methods and systems are described for obtaining a set of carrier-modulated symbols of a carrier-modulated codeword, each carrier-modulated symbol received via a respective wire of a plurality of wires of a multi-wire bus, applying each carrier-modulated symbol of the set of carrier-modulated symbols to a corresponding transistor of a set of transistors, the set of transistors further connected to a pair of output nodes according to a sub-channel vector of a plurality of mutually orthogonal sub-channel vectors, recovering a demodulation signal from the carrier-modulated symbols, and generating a demodulated sub-channel data output as a differential voltage on the pair of output nodes based on a linear combination of the set of carrier-modulated symbols by controlling conductivity of the set of transistors according to the demodulation signal.

20 Claims, 9 Drawing Sheets

Related U.S. Application Data continuation of application No. 16/909,529, filed on Jun. 23, 2020, now Pat. No. 11,063,799, which is a continuation of application No. 16/236,012, filed on Dec. 28, 2018, now Pat. No. 10,693,688.

(60) Provisional application No. 62/611,523, filed on Dec. 28, 2017.

(51) Int. Cl.
*H04L 25/49* (2006.01)
*H04L 27/148* (2006.01)
*H04L 27/26* (2006.01)
*H04L 27/00* (2006.01)

(52) U.S. Cl.
CPC ........ *H04L 25/4919* (2013.01); *H04L 27/148* (2013.01); *H04L 27/2605* (2013.01); *H04L 2027/0036* (2013.01); *H04L 2201/04* (2013.01)

(58) Field of Classification Search
CPC ......... H04L 27/2605; H04L 2027/0036; H04L 2201/04; H04L 25/0272; H04L 7/033; H03L 7/08; H03L 7/0992
See application file for complete search history.

(56) References Cited

U.S. PATENT DOCUMENTS

| | | |
|---|---|---|
| 4,163,258 A | 7/1979 | Ebihara et al. |
| 4,181,967 A | 1/1980 | Linford et al. |
| 4,206,316 A | 6/1980 | Bancroft et al. |
| 4,414,512 A | 11/1983 | Nelson |
| 4,499,550 A | 2/1985 | Ray et al. |
| 5,053,974 A | 10/1991 | Penz |
| 5,150,384 A | 9/1992 | Cahill |
| 5,166,956 A | 11/1992 | Baltus et al. |
| 5,168,509 A | 12/1992 | Nakamura et al. |
| 5,311,516 A | 5/1994 | Kuznicki et al. |
| 5,331,320 A | 7/1994 | Cideciyan et al. |
| 5,388,126 A | 2/1995 | Rypinski et al. |
| 5,412,689 A | 5/1995 | Chan et al. |
| 5,449,895 A | 9/1995 | Hecht et al. |
| 5,553,097 A | 9/1996 | Dagher |
| 5,659,353 A | 8/1997 | Kostreski et al. |
| 5,727,006 A | 3/1998 | Dreyer et al. |
| 5,856,935 A | 1/1999 | Moy et al. |
| 5,982,954 A | 11/1999 | Delen et al. |
| 6,005,895 A | 12/1999 | Perino et al. |
| 6,084,883 A | 7/2000 | Norrell et al. |
| 6,084,958 A | 7/2000 | Blossom |
| 6,097,732 A | 8/2000 | Jung |
| 6,111,895 A | 8/2000 | Miller et al. |
| 6,154,498 A | 11/2000 | Dabral et al. |
| 6,226,330 B1 | 5/2001 | Mansur |
| 6,278,740 B1 | 8/2001 | Nordyke |
| 6,317,465 B1 | 11/2001 | Akamatsu et al. |
| 6,359,931 B1 | 3/2002 | Perino et al. |
| 6,417,737 B1 | 7/2002 | Moloudi et al. |
| 6,452,420 B1 | 9/2002 | Wong |
| 6,483,828 B1 | 11/2002 | Balachandran et al. |
| 6,504,875 B2 | 1/2003 | Perino et al. |
| 6,522,699 B1 | 2/2003 | Anderson et al. |
| 6,556,628 B1 | 4/2003 | Poulton et al. |
| 6,621,427 B2 | 9/2003 | Greenstreet |
| 6,621,945 B2 | 9/2003 | Bissessur |
| 6,650,638 B1 | 11/2003 | Walker et al. |
| 6,650,699 B1 | 11/2003 | Tierno |
| 6,658,234 B1 | 12/2003 | Dogan et al. |
| 6,661,355 B2 | 12/2003 | Cornelius et al. |
| 6,686,879 B2 | 2/2004 | Shattil |
| 6,766,342 B2 | 7/2004 | Kechriotis |
| 6,839,429 B1 | 1/2005 | Gaikwad et al. |
| 6,842,489 B2 | 1/2005 | Masenten |
| 6,865,236 B1 | 3/2005 | Terry |
| 6,876,317 B2 | 4/2005 | Sankaran |
| 6,898,724 B2 | 5/2005 | Chang |
| 6,954,492 B1 | 10/2005 | Williams |
| 6,963,622 B2 | 11/2005 | Eroz et al. |
| 6,990,138 B2 | 1/2006 | Bejjani et al. |
| 6,993,311 B2 | 1/2006 | Li et al. |
| 6,999,516 B1 | 2/2006 | Rajan |
| 7,023,817 B2 | 4/2006 | Kuffner et al. |
| 7,039,136 B2 | 5/2006 | Olson et al. |
| 7,072,387 B1 | 7/2006 | Betts |
| 7,075,996 B2 | 7/2006 | Simon et al. |
| 7,120,198 B1 | 10/2006 | Dafesh et al. |
| 7,127,003 B2 | 10/2006 | Rajan et al. |
| 7,142,612 B2 | 11/2006 | Horowitz et al. |
| 7,167,523 B2 | 1/2007 | Mansur |
| 7,180,949 B2 | 2/2007 | Kleveland et al. |
| 7,184,483 B2 | 2/2007 | Rajan |
| 7,269,212 B1 | 9/2007 | Chau et al. |
| 7,349,484 B2 | 3/2008 | Stojanovic et al. |
| 7,356,213 B1 | 4/2008 | Cunningham et al. |
| 7,358,869 B1 | 4/2008 | Chiarulli et al. |
| 7,428,273 B2 | 9/2008 | Foster |
| 7,496,130 B2 | 2/2009 | Rumney |
| 7,496,162 B2 | 2/2009 | Srebranig |
| 7,599,390 B2 | 10/2009 | Pamarti |
| 7,633,850 B2 | 12/2009 | Ahn |
| 7,639,596 B2 | 12/2009 | Cioffi |
| 7,643,588 B2 | 1/2010 | Visalli et al. |
| 7,656,321 B2 | 2/2010 | Wang |
| 7,706,456 B2 | 4/2010 | Laroia et al. |
| 7,746,764 B2 | 6/2010 | Rawlins et al. |
| 7,787,572 B2 | 8/2010 | Scharf et al. |
| 7,808,883 B2 | 10/2010 | Green |
| 7,868,790 B2 | 1/2011 | Bae |
| 7,869,546 B2 | 1/2011 | Tsai |
| 7,899,653 B2 | 3/2011 | Hollis |
| 7,907,676 B2 | 3/2011 | Stojanovic et al. |
| 8,050,332 B2 | 11/2011 | Chung et al. |
| 8,055,095 B2 | 11/2011 | Palotai et al. |
| 8,149,906 B2 | 4/2012 | Saito et al. |
| 8,159,375 B2 | 4/2012 | Abbasfar |
| 8,159,376 B2 | 4/2012 | Abbasfar |
| 8,199,849 B2 | 6/2012 | Oh et al. |
| 8,199,863 B2 | 6/2012 | Chen et al. |
| 8,218,670 B2 | 7/2012 | Abou |
| 8,238,318 B1 | 8/2012 | Negus |
| 8,245,094 B2 | 8/2012 | Jiang et al. |
| 8,279,745 B2 | 10/2012 | Dent |
| 8,279,976 B2 | 10/2012 | Lin et al. |
| 8,284,848 B2 | 10/2012 | Nam et al. |
| 8,289,914 B2 | 10/2012 | Li et al. |
| 8,295,250 B2 | 10/2012 | Gorokhov et al. |
| 8,365,035 B2 | 1/2013 | Hara |
| 8,406,316 B2 | 3/2013 | Sugita et al. |
| 8,457,261 B1 | 6/2013 | Shi et al. |
| 8,472,513 B2 | 6/2013 | Malipatil et al. |
| 8,498,368 B1 | 7/2013 | Husted et al. |
| 8,520,493 B2 | 8/2013 | Goulahsen |
| 8,539,318 B2 | 9/2013 | Shokrollahi et al. |
| 8,577,284 B2 | 11/2013 | Seo et al. |
| 8,588,254 B2 | 11/2013 | Diab et al. |
| 8,588,280 B2 | 11/2013 | Oh et al. |
| 8,593,305 B1 | 11/2013 | Tajalli et al. |
| 8,620,166 B2 | 12/2013 | Guha |
| 8,644,497 B2 | 2/2014 | Clausen et al. |
| 8,649,445 B2 | 2/2014 | Cronie et al. |
| 8,687,968 B2 | 4/2014 | Nosaka et al. |
| 8,718,184 B1 | 5/2014 | Cronie et al. |
| 8,731,039 B1 | 5/2014 | Sarrigeorgidis et al. |
| 8,755,426 B1 | 6/2014 | Cronie et al. |
| 8,773,964 B2 | 7/2014 | Hsueh et al. |
| 8,780,687 B2 | 7/2014 | Clausen et al. |
| 8,792,594 B2 | 7/2014 | Vojcic et al. |
| 8,831,440 B2 | 9/2014 | Yu et al. |
| 8,879,660 B1 | 11/2014 | Peng et al. |
| 8,938,171 B2 | 1/2015 | Tang et al. |
| 8,949,693 B2 | 2/2015 | Ordentlich et al. |
| 8,989,317 B1 | 3/2015 | Holden et al. |
| 8,996,740 B2 | 3/2015 | Wiley et al. |

(56) References Cited

U.S. PATENT DOCUMENTS

| | | |
|---|---|---|
| 9,015,566 B2 | 4/2015 | Cronie et al. |
| 9,020,049 B2 | 4/2015 | Schwager et al. |
| 9,071,476 B2 | 6/2015 | Fox et al. |
| 9,077,386 B1 | 7/2015 | Holden et al. |
| 9,100,232 B1 | 8/2015 | Hormati et al. |
| 9,124,557 B2 | 9/2015 | Fox et al. |
| 9,197,470 B2 | 11/2015 | Okunev |
| 9,246,713 B2 | 1/2016 | Shokrollahi |
| 9,251,873 B1 | 2/2016 | Fox et al. |
| 9,288,082 B1 | 3/2016 | Ulrich et al. |
| 9,288,089 B2 | 3/2016 | Cronie et al. |
| 9,300,503 B1 | 3/2016 | Holden et al. |
| 9,331,962 B2 | 5/2016 | Lida et al. |
| 9,362,974 B2 | 6/2016 | Fox et al. |
| 9,363,114 B2 | 6/2016 | Shokrollahi et al. |
| 9,401,828 B2 | 7/2016 | Cronie et al. |
| 9,432,082 B2 | 8/2016 | Ulrich et al. |
| 9,444,654 B2 | 9/2016 | Hormati et al. |
| 9,461,862 B2 | 10/2016 | Holden et al. |
| 9,479,369 B1 | 10/2016 | Shokrollahi |
| 9,509,437 B2 | 11/2016 | Shokrollahi |
| 9,537,644 B2 | 1/2017 | Jones et al. |
| 9,634,797 B2 | 4/2017 | Benammar et al. |
| 9,667,379 B2 | 5/2017 | Cronie et al. |
| 9,710,412 B2 | 7/2017 | Sengoku |
| 9,825,723 B2 | 11/2017 | Holden et al. |
| 9,852,806 B2 | 12/2017 | Stauffer et al. |
| 10,055,372 B2 | 8/2018 | Shokrollahi |
| 10,243,614 B1 | 3/2019 | Ulrich et al. |
| 10,347,283 B2 | 7/2019 | Hormati et al. |
| 2001/0006538 A1 | 7/2001 | Simon et al. |
| 2001/0055294 A1 | 12/2001 | Motoyoshi |
| 2002/0034191 A1 | 3/2002 | Shattil |
| 2002/0044316 A1 | 4/2002 | Myers |
| 2002/0097791 A1 | 7/2002 | Hansen |
| 2002/0152340 A1 | 10/2002 | Dreps et al. |
| 2002/0174373 A1 | 11/2002 | Chang |
| 2002/0181607 A1 | 12/2002 | Izumi |
| 2003/0071684 A1 | 4/2003 | Noori |
| 2003/0086366 A1 | 5/2003 | Branlund et al. |
| 2003/0087634 A1 | 5/2003 | Raghavan et al. |
| 2004/0057525 A1 | 3/2004 | Rajan et al. |
| 2004/0146117 A1 | 7/2004 | Subramaniam et al. |
| 2004/0155802 A1 | 8/2004 | Amy et al. |
| 2004/0161019 A1 | 8/2004 | Raghavan et al. |
| 2004/0203834 A1 | 10/2004 | Mahany |
| 2004/0239374 A1 | 12/2004 | Hori |
| 2005/0063493 A1 | 3/2005 | Foster |
| 2005/0213686 A1 | 9/2005 | Love et al. |
| 2006/0013331 A1 | 1/2006 | Choi et al. |
| 2006/0056538 A1 | 3/2006 | Nam et al. |
| 2006/0120486 A1 | 6/2006 | Visalli et al. |
| 2006/0126751 A1 | 6/2006 | Bessios |
| 2006/0133538 A1 | 6/2006 | Stojanovic et al. |
| 2006/0159005 A1 | 7/2006 | Rawlins et al. |
| 2006/0251421 A1 | 11/2006 | Arnon |
| 2006/0274862 A1 | 12/2006 | Lui et al. |
| 2006/0291589 A1 | 12/2006 | Eliezer et al. |
| 2007/0030796 A1 | 2/2007 | Green |
| 2007/0070967 A1 | 3/2007 | Yang et al. |
| 2007/0097579 A1 | 5/2007 | Amamiya |
| 2008/0043677 A1 | 2/2008 | Kim et al. |
| 2008/0104374 A1 | 5/2008 | Mohamed |
| 2008/0192621 A1 | 8/2008 | Suehiro |
| 2008/0316070 A1 | 12/2008 | Van et al. |
| 2009/0046009 A1 | 2/2009 | Fujii |
| 2009/0059782 A1 | 3/2009 | Cole |
| 2009/0092196 A1 | 4/2009 | Okunev |
| 2009/0110106 A1 | 4/2009 | Wornell et al. |
| 2009/0154604 A1 | 6/2009 | Lee et al. |
| 2009/0163162 A1 | 6/2009 | Hoffman et al. |
| 2010/0046644 A1 | 2/2010 | Mazet |
| 2010/0054355 A1 | 3/2010 | Kinjo et al. |
| 2010/0081451 A1 | 4/2010 | Mueck et al. |
| 2010/0215087 A1 | 8/2010 | Tsai |
| 2010/0215112 A1 | 8/2010 | Tsai et al. |
| 2010/0235673 A1 | 9/2010 | Abbasfar |
| 2010/0296556 A1 | 11/2010 | Rave et al. |
| 2010/0309964 A1 | 12/2010 | Oh et al. |
| 2011/0014865 A1 | 1/2011 | Seo et al. |
| 2011/0018749 A1 | 1/2011 | Muto et al. |
| 2011/0110340 A1 | 5/2011 | Lakkis |
| 2011/0122767 A1 | 5/2011 | Dent |
| 2011/0134678 A1 | 6/2011 | Sato et al. |
| 2011/0228864 A1 | 9/2011 | Aryanfar et al. |
| 2011/0235501 A1 | 9/2011 | Goulahsen |
| 2011/0255714 A1 | 10/2011 | Neusinger et al. |
| 2011/0268225 A1 | 11/2011 | Cronie et al. |
| 2011/0286497 A1 | 11/2011 | Nervig |
| 2011/0299555 A1 | 12/2011 | Cronie et al. |
| 2011/0302478 A1 | 12/2011 | Cronie et al. |
| 2012/0161945 A1 | 6/2012 | Single et al. |
| 2012/0213299 A1 | 8/2012 | Cronie et al. |
| 2012/0257683 A1 | 10/2012 | Schwager et al. |
| 2013/0010892 A1 | 1/2013 | Cronie et al. |
| 2013/0013870 A1 | 1/2013 | Cronie et al. |
| 2013/0114392 A1 | 5/2013 | Sun et al. |
| 2013/0129019 A1 | 5/2013 | Sorrells et al. |
| 2013/0202001 A1 | 8/2013 | Zhang |
| 2013/0259113 A1 | 10/2013 | Kumar |
| 2014/0006649 A1 | 1/2014 | Wiley et al. |
| 2014/0177645 A1 | 6/2014 | Cronie et al. |
| 2014/0254642 A1 | 9/2014 | Fox et al. |
| 2015/0078479 A1 | 3/2015 | Whitby-Strevens |
| 2015/0222458 A1 | 8/2015 | Hormati et al. |
| 2015/0236885 A1 | 8/2015 | Ling et al. |
| 2015/0249559 A1 | 9/2015 | Shokrollahi et al. |
| 2015/0280841 A1 | 10/2015 | Gudovskiy et al. |
| 2015/0333940 A1 | 11/2015 | Shokrollahi |
| 2015/0349835 A1 | 12/2015 | Fox et al. |
| 2015/0365263 A1 | 12/2015 | Zhang et al. |
| 2015/0380087 A1 | 12/2015 | Mittelholzer et al. |
| 2015/0381768 A1 | 12/2015 | Fox et al. |
| 2016/0020824 A1 | 1/2016 | Ulrich et al. |
| 2016/0036616 A1 | 2/2016 | Holden et al. |
| 2016/0211929 A1 | 7/2016 | Holden et al. |
| 2016/0218894 A1 | 7/2016 | Fox et al. |
| 2016/0338040 A1 | 11/2016 | Lee et al. |
| 2016/0373141 A1 | 12/2016 | Chou et al. |
| 2016/0380787 A1 | 12/2016 | Hormati et al. |
| 2017/0195961 A1 | 7/2017 | Chakraborty et al. |
| 2017/0272285 A1 | 9/2017 | Shokrollahi et al. |
| 2017/0302237 A1 | 10/2017 | Akter et al. |
| 2017/0353205 A1 | 12/2017 | Chakraborty et al. |
| 2019/0103903 A1 | 4/2019 | Yang |
| 2019/0221153 A1 | 7/2019 | Tsuchi et al. |
| 2019/0238379 A1 | 8/2019 | Walk et al. |
| 2019/0245560 A1 | 8/2019 | Yang et al. |
| 2020/0321778 A1 | 10/2020 | Gharibdoust et al. |
| 2021/0258029 A1 | 8/2021 | Cyzs |
| 2021/0297292 A1 | 9/2021 | Hormati |

FOREIGN PATENT DOCUMENTS

| | | |
|---|---|---|
| JP | 2003163612 A | 6/2003 |
| JP | 4394755 B2 | 10/2009 |
| WO | 2005032000 A1 | 4/2005 |
| WO | 2009084121 A1 | 7/2009 |
| WO | 2010031824 A1 | 3/2010 |
| WO | 2019241081 A1 | 12/2019 |

OTHER PUBLICATIONS

Abbasfar, Aliazam , "Generalized Differential Vector Signaling", IEEE International Conference on Communications, ICC '09, Jun. 14, 2009, 1-5 (5 pages).

Anonymous , "Constant-weight code", Wikipedia.org, retrieved on Feb. 6, 2017, (3 pages).

Counts, Lew , et al., "One-Chip "Slide Rule" Works with Logs, Antilogs for Real-Time Processing", Analog Devices, Computational Products 6, Reprinted from Electronic Design, May 2, 1985, 3-9 (7 pages).

(56) References Cited

OTHER PUBLICATIONS

Dasilva, Victor, et al., "Multicarrier Orthogonal CDMA Signals for Quasi-Synchronous Communication Systems", IEEE Journal on Selected Areas in Communications, vol. 12, No. 5, Jun. 1994, 842-852 (11 pages).

Farzan, Kamran, et al., "Coding Schemes for Chip-to-Chip Interconnect Applications", IEEE Transactions on Very Large Scale Integration (VLSI) Systems, vol. 14, No. 4, Apr. 2006, 393-406 (14 pages).

Giovaneli, Carlos Lopez, et al., "Space-Frequency Coded OFDM System for Multi-Wire Power Line Communications", Power Line Communications and its Applications, 2005 International Symposium on Vancouver, BC, Canada, IEEE XP-002433844, Apr. 6-8, 2005, 191-195 (5 pages).

Healey, Adam, et al., "A Comparison of 25 Gbps NRZ & PAM-4 Modulation used in Legacy & Premium Backplane Channels", Tyco Electronics Corporation, DesignCon 2012, Jan. 2012, 1-16 (16 pages).

Holden, Brian, "An exploration of the technical feasibility of the major technology options for 400GE backplanes", IEEE 802.3 400GE Study Group, Geneva, CH, Jul. 16, 2013, 1-18 (18 pages).

Holden, Brian, "Simulation results for NRZ, ENRZ & PAM-4 on 16-wire full-sized 400GE backplanes", IEEE 802.3 400GE Study Group, York, UK, Sep. 2, 2013, 1-19 (19 pages).

Holden, Brian, "Using Ensemble NRZ Coding for 400GE Electrical Interfaces", IEEE 802.3 400GE Study Group, May 17, 2013, 1-24 (24 pages).

Jiang, Anxiao, et al., "Rank Modulation for Flash Memories", IEEE Transactions of Information Theory, vol. 55, No. 6, Jun. 2009, 2659-2673 (16 pages).

Oh, Dan, et al., "Pseudo-Differential Vector Signaling for Noise Reduction in Single-Ended Signaling Systems", DesignCon 2009, Rambus Inc., Jan. 2009, (22 pages).

Penttinen, Jyrki, et al., "Performance Model for Orthogonal Sub Channel in Noise-limited Environment", Sixth International Conference on Wireless and Mobile Communications, 2010, 56-61 (6 pages).

Poulton, John, "Multiwire Differential Signaling", UNC-CH Department of Computer Science Version 1.1, Aug. 6, 2003, 1-20 (20 pages).

She, James, et al., "A Framework of Cross-Layer Superposition Coded Multicast for Robust IPTV Services over WiMAX", IEEE Wireless Communications and Networking Conference, Apr. 15, 2008, 3139-3144 (6 pages).

Skliar, Osvaldo, et al., "A Method For the Analysis of Signals: the Square-Wave Method", Revista de Matematica Teoria y Aplicationes, vol. 15, No. 2, Mar. 2008, 109-129 (21 pages).

Slepian, David, "Permutation Modulation", Proceedings of the IEE, vol. 53, No. 3, Mar. 1965, 228-236 (9 pages).

Wada, Tadahiro, et al., "A Study on Orthogonal Multi-Code CDMA Systems Using Constant Amplitude Coding", Technical Report of IEICE, vol. 97, No. 132, Jun. 24, 1997, 19-24 (6 pages).

Wang, Xin, et al., "Applying CDMA Technique to Network-on-Chip", IEEE Transactions on Very Large Scale Integration (VLSI) Systems, vol. 15, No. 10, Oct. 1, 2007, 1091-1100 (10 pages).

Wendemagegnehu, T. Beyene, et al., "Controlled Intersymbol Interference Design Techniques of Conventional Interconnection Systems for Data Rates beyond 20 Gbps", IEEE Transactions on Advanced Packaging, vol. 31, No. 4, Nov. 2008, 731-740 (11 pages).

SYNCHRONOUSLY-SWITCHED MULTI-INPUT DEMODULATING COMPARATOR

CROSS-REFERENCE TO RELATED APPLICATIONS

This application is a continuation of U.S. application Ser. No. 17/367,392, filed Jul. 4, 2021, now U.S. Pat. No. 11,469,931, granted Oct. 11. 2022, naming Armin Tajalli, entitled "Synchronously-Switched Multi-Input Demodulating Comparator", which is a continuation of U.S. application Ser. No. 16/909,529, filed Jun. 23, 2020, now U.S. Pat. No. 11,063,799, granted Jul. 13, 2021, naming Armin Tajalli, entitled "Synchronously-Switched Multi-Input Demodulating Comparator", which is a continuation of U.S. application Ser. No. 16/236,012, filed Dec. 28, 2018, now U.S. Pat. No. 10,693,688, granted Jun. 23, 2020, naming Armin Tajalli, entitled "Synchronously-Switched Multi-Input Demodulating Comparator", which claims the benefit of U.S. Provisional Application No. 62/611,523, filed Dec. 28, 2017, naming Armin Tajalli, entitled "Combined Multi-Input Comparator and Demodulator", all of which are hereby incorporated by reference in their entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, now U.S. Pat. No. 9,288,089, granted Mar. 15, 2016, naming Harm Cronie and Amin Shokrollahi, entitled "Orthogonal Differential Vector Signaling", hereinafter identified as [Cronie I];

U.S. patent application Ser. No. 13/030,027, filed Feb. 17, 2011, now U.S. Pat. No. 8,649,445, granted Feb. 11, 2014, naming Harm Cronie, Amin Shokrollahi and Armin Tajalli, entitled "Methods and Systems for Noise Resilient, Pin-Efficient and Low Power Communications with Sparse Signaling Codes", hereinafter identified as [Cronie II];

U.S. patent application Ser. No. 14/158,452, filed Jan. 17, 2014, now U.S. Pat. No. 9,124,557, granted Sep. 1, 2015, naming John Fox, Brian Holden, Peter Hunt, John D Keay, Amin Shokrollahi, Richard Simpson, Anant Singh, Andrew Kevin John Stewart, and Giuseppe Surace, entitled "Chip-to-Chip Communication with Reduced SSO Noise", hereinafter identified as [Fox I];

U.S. patent application Ser. No. 13/842,740, filed Mar. 15, 2013, now U.S. Pat. No. 9,300,503, granted Mar. 29, 2016, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application No. 61/934,804, filed Feb. 2, 2014, now U.S. patent application Ser. No. 14/612, 241, filed Feb. 2, 2015, Pat. No. 9,100,232, granted Aug. 6, 2015, naming Ali Hormati and Amin Shokrollahi, entitled "Methods for Code Evaluation Using ISI Ratio", hereinafter identified as [Hormati I]; U.S. Provisional Patent Application No. 61/934,804, filed Feb. 2, 2014, now U.S. patent application Ser. No. 14/612,241, filed Feb. 2, 2015, Pat. No. 9,100,232, granted Aug. 6, 2015, naming Ali Hormati and Amin Shokrollahi, entitled "Methods for Code Evaluation Using ISI Ratio", hereinafter identified as [Hormati IL];

U.S. Provisional Patent Application No. 62/026,860, filed Jul. 21, 2014, now U.S. patent application Ser. 14/803,996, filed Jul. 20, 2015, Pat. No. 9,444,654, granted Sep. 13, 2016, naming Ali Hormati and Amin Shokrollahi, entitled "Multidrop Data Transfer", hereinafter identified as [Hormati II];

U.S. patent application Ser. No. 15/194,497, filed Jun. 27, 2016, now U.S. Pat. No. 9,832,046, granted Nov. 28, 2017, naming Ali Hormati, Armin Tajalli, and Amin Shokrollahi, entitled "Method and Apparatus for High-Speed Chip-to-Chip Communications", hereinafter identified as [Hormati III];

U.S. patent application Ser. No. 15/802,365, filed Nov. 2, 2017, now U.S. Pat. No. 10,347,283, granted Jul. 9, 2019, naming Ali Hormati and Armin Tajalli, entitled "Clock Data Recovery in Multilane Data Receiver", hereinafter identified as [Hormati IV].

U.S. Provisional Patent Application No. 61/934,807, filed Feb. 2, 2014, now U.S. patent application Ser. No. 14/612, 252, filed Feb. 2, 2015, Pat. No. 9,479,369, granted Oct. 25, 2016, naming Amin Shokrollahi, entitled "Vector Signaling Codes with High pin-efficiency and their Application to Chip-to-Chip Communications and Storage", hereinafter identified as [Shokrollahi I];

U.S. Provisional Patent Application No. 61/839,360, filed Jun. 23, 2013, now U.S. patent application Ser. No. 14/313, 966, filed Jun. 24, 2014, Pat. No. 9,246,713, granted Jan. 26, 2016, naming Amin Shokrollahi, entitled "Vector Signaling Codes with Reduced Receiver Complexity", hereinafter identified as [Shokrollahi II]. U.S. Provisional Patent Application No. 61/839,360, filed Jun. 23, 2013, now U.S. patent application Ser. No. 14/313,966, filed Jun. 24, 2014, Pat. No. 9,246,713, granted Jan. 26, 2016, naming Amin Shokrollahi, entitled "Vector Signaling Codes with Reduced Receiver Complexity", hereinafter identified as [Shokrollahi II].

U.S. Provisional Patent Application No. 61/946,574, filed Feb. 28, 2014, now U.S. patent application Ser. No. 14/636, 098, filed Mar. 2, 2015, Pat. No. 9,363,114, granted Jun. 7, 2016, naming Amin Shokrollahi, Brian Holden, and Richard Simpson, entitled "Clock Embedded Vector Signaling Codes", hereinafter identified as [Shokrollahi III]. U.S. Provisional Patent Application No. 61/946,574, filed Feb. 28, 2014, now U.S. patent application Ser. No. 14/636,098, filed Mar. 2, 2015, Pat. No. 9,363,114, granted Jun. 7, 2016, naming Amin Shokrollahi, Brian Holden, and Richard Simpson, entitled "Clock Embedded Vector Signaling Codes", hereinafter identified as [Shokrollahi III].

U.S. Provisional Patent Application No. 62/015,172, filed Jul. 10, 2014, now U.S. patent application Ser. No. 14/746, 477, filed Jun. 22, 2015, Pat. No. 9,852,806, granted Dec. 26, 2017, naming Amin Shokrollahi and Roger Ulrich, entitled "Vector Signaling Codes with Increased Signal to Noise Characteristics", hereinafter identified as [Shokrollahi IV].

U.S. patent application Ser. No. 13/895,206, filed May 15, 2013, now U.S. Pat. No. 9,288,082, granted Mar. 15, 2016, naming Roger Ulrich and Peter Hunt, entitled "Circuits for Efficient Detection of Vector Signaling Codes for Chip to Chip Communications using Sums of Differences", hereinafter identified as [Ulrich I]. U.S. patent application Ser. No. 13/895,206, filed May 15, 2013, now U.S. Pat. No. 9,288, 082, granted Mar. 15, 2016, naming Roger Ulrich and Peter Hunt, entitled "Circuits for Efficient Detection of Vector Signaling Codes for Chip-to-Chip Communications using Sums of Differences", hereinafter identified as [Ulrich I].

"Controlled Intersymbol Interference Design Techniques of Conventional Interconnection Systems for Data Rates beyond 20 Gbps", Wendemagegnehu T. Beyene and Amir Amirkhany, IEEE Transactions on Advanced Packaging, Vol. 31 No. 4, pg. 731-740, Nov. 2008, hereinafter identified as [Beyene].

TECHNICAL FIELD

The present invention relates to communications in general and in particular to the transmission of signals capable of conveying information and detection of those signals in wired communication.

BACKGROUND

In communication systems, a goal is to transport information from one physical location to another. It is typically desirable that the transport of this information is reliable, is fast and consumes a minimal amount of resources. Methods of information transport are broadly categorized into "baseband" methods that dedicate use of the physical communications channel to one transport method, and "broadband" methods that partition the physical communications channel in the frequency domain, creating two or more independent frequency channels upon which a transport method may be applied.

Baseband methods may be further categorized by physical medium. One common information transfer medium is the serial communications link, which may be based on a single wire circuit relative to ground or other common reference, multiple such circuits relative to ground or other common reference, or multiple such circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

Parallel data transfer is also commonly used to provide increased interconnection bandwidth, with busses growing from 16 or fewer wires, to 32, 64, and more. As crosstalk and noise induced on the parallel signal lines can produce receive errors, parity was added to improve error detection, and signal anomalies were addressed through active bus termination methods. However, these wide data transfer widths inevitably resulted in data skew, which became the limiting factor in increased bus data transfer throughput. Alternative approaches were developed utilizing narrower bus widths operating at much higher clock speeds, with significant effort placed on optimizing the transmission line characteristics of the interconnection medium, including use of impedance-controlled connectors and micro stripline wiring. Even so, the inevitable path imperfections required use of active equalization and inter-symbol interference (ISI) elimination techniques, including active pre-emphasis compensation for transmitters and Continuous Time Linear Equalization (CTLE) and Decision Feedback Equalization (DFE) for receivers, all of which increased the complexity and power consumption of the communications interface.

A number of signaling methods are known that maintain the desirable properties of DS, while increasing pin efficiency over DS. One such method is Vector signaling. With vector signaling, a plurality of signals on a plurality of wires is considered collectively although each of the plurality of signals might be independent. Thus, vector signaling codes can combine the robustness of single circuit DS and the high wire count data transfer throughput of parallel data transfer. Each of the collective signals in the transport medium carrying a vector signaling codeword is referred to as a component, and the number of plurality of wires is referred to as the "dimension" of the codeword (sometimes also called a "vector"). With binary vector signaling, each component or "symbol" of the vector takes on one of two possible values. With non-binary vector signaling, each symbol has a value that is a selection from a set of more than two possible values. The set of values that a symbol of the vector may take on is called the "alphabet" of the vector signaling code. A vector signaling code, as described herein, is a collection C of vectors of the same length N, called codewords. Any suitable subset of a vector signaling code denotes a "subcode" of that code. Such a subcode may itself be a vector signaling code. In operation, the coordinates of the codewords are bounded, and we choose to represent them by real numbers between -1 and 1. The ratio between the binary logarithm of the size of C and the length N is called the pin-efficiency of the vector signaling code. A vector signaling code is called "balanced" if for all its codewords the sum of the coordinates is always zero. Additional examples of vector signaling methods are described in Cronie I, Cronie II, Cronie III, Cronie IV, Fox I, Fox II, Fox III, Holden I, Shokrollahi I, Shokrollahi II, and Hormati I.

As previously described, broadband signaling methods partition the available information transfer medium in the frequency domain, creating two or more frequency-domain "channels" which may then may transport information in a comparable manner to baseband circuits, using known methods of carrier modulation to convert the baseband information into a frequency-domain channel signal. As each such channel can be independently controlled as to amplitude, modulation, and information encoding, it is possible to adapt the collection of channels to widely varying information transfer medium characteristics, including variations in signal loss, distortion, and noise over time and frequency.

Asymmetric Digital Subscriber Line or ADSL is one widely deployed broadband signaling method used to transport digital data over legacy copper telephony circuits. In ADSL, each of potentially several hundred frequency-domain channels is independently configured for amplitude, modulation method, and digital carrying capacity, based on the particular noise and loss characteristics of the copper circuit being used for transport.

BRIEF DESCRIPTION

Methods and systems are described for obtaining a set of carrier-modulated symbols of a carrier-modulated codeword, each carrier-modulated symbol received via a respective wire of a plurality of wires of a multi-wire bus, applying each carrier-modulated symbol of the set of carrier-modulated symbols to a corresponding transistor of a set of transistors, each transistor of the set of transistors connected to a respective output node of a pair of output nodes according to elements of a sub-channel vector, and controlling conductivity of the set of transistors according to a demodulation signal operating at a frequency recovered from the carrier-modulated symbols to responsively generate a demodulated sub-channel data output as a linear combination of the set of carrier-modulated symbols forming a differential voltage on the pair of output nodes.

Communication of digital information using a combination of baseband and broadband techniques over multiple wires is described. A four wire communications channel having 35 dB of attenuation at 37.5 GHz is used in provided examples as a typical transport medium for use with the systems and methods described herein. One embodiment creates two frequency-based channels over the transport medium, with each channel using a combination of a vector signaling code and duobinary encoding to transport sets of three data bits over four wires at an effective rate of 56 Gigabits per second per wire.

DETAILED DESCRIPTION

Figure 1:
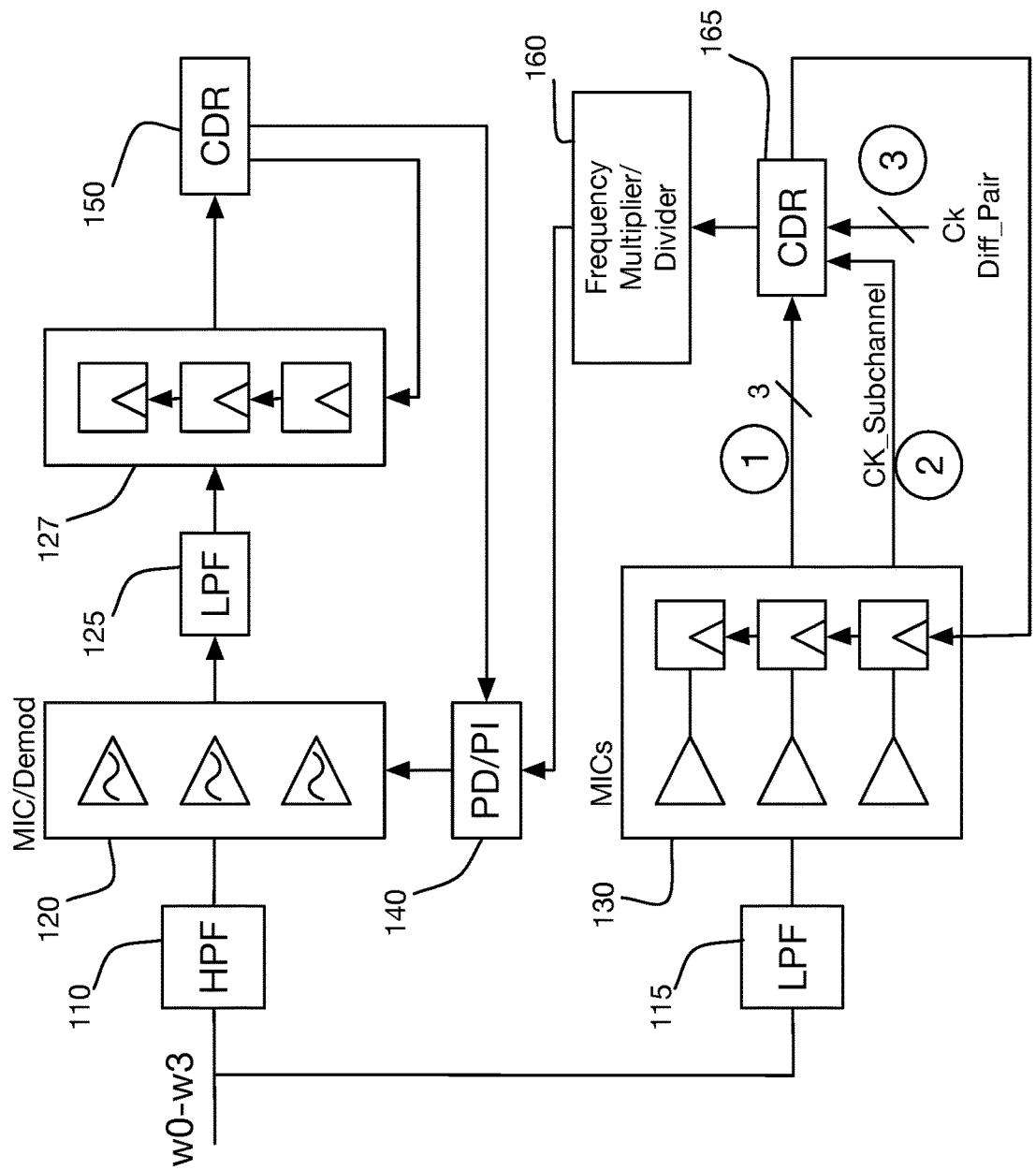
FIG. 1 is a block diagram of a receiver embodiment.

Interconnection has long been a limiting factor in the design of large digital systems. Whether at the level of modules interconnected by a backplane, or of functional subsystems interconnected within a large printed circuit board, the need for reliable, error free, high-speed digital interconnection has constantly pushed the limits of available technology to its limits.

The systems and methods described herein provide robust, reliable transfer of data between at least one transmitting device and at least one receiving device, at data rates of at least 50 Gigabits per second per interconnection wire. An example channel model having the frequency- and time-domain characteristics illustrated in FIG. 1 will be used. It will be obvious to one familiar with the art that such a transport channel is incompatible with conventional communication signaling methods; for example, straightforward NRZ signaling at an example 112 Gibabits/second has a Nyquist frequency of 56 GHz, corresponding to an intractable 46 dB attenuation over the proposed physical transport channel.

This proposed data rate also strains integrated circuit data processing capabilities within the attached transmitting and receiving devices. It is therefore presumed that high-speed data handling in these devices will be distributed across multiple parallel processing "phases". As one example, rather than a single data path handling data at 100 Gigabits per second (i.e. with merely 10 picosecond between bits), the same data stream may be distributed across sixteen processing phases, each one thus having a more reasonable 160 picoseconds of processing time per bit. However, this added processing time comes at the cost of significantly increased complexity from the additional processing elements. This distribution of processing also can lead to increased latency before a given digital bit result becomes available, limiting the ability to utilize that result in predicting a subsequent bit result, which is the basis of the Decision Feedback Equalization or DFE method.

The increasing data transfer rates also lead to physical issues as the wavelength of the propagating signals on the interconnection shrinks. As one example, the propagating signal wavelength at 56 Gigahertz on a printed circuit micro stripline is approximately 4 millimeters, thus periodic anomalies with merely fractional wavelength dimensions (even including the weave of the impregnated fabric comprising the circuit board) may represent a significant disturbance to signal integrity, stressing available equalization and compensation methods.

Encoding information using Hadamard Transforms

As taught in [Cronie I], the Hadamard Transform, also known as the Walsh-Hadamard transform, is a square matrix of entries +1 and −1 so arranged that both all rows and all columns are mutually orthogonal. Hadamard matrices are known for all sizes 2N as well as for selected other sizes. In particular, the description herein utilizes the 4×4 Hadamard matrix as the example encoder.

The order 4 Hadamard matrix used in our examples is:

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad \text{(Eqn. 1)}$$

and encoding of the three informational bits A, B, C may be obtained by multiplying those informational bits times the rows 2, 3, and 4 of the Hadamard matrix $H_4$ to obtain four output values, subsequently called "symbol values". By convention, the results are scaled by an appropriate constant factor so as to bound the symbol values to the range +1 to −1. It may be noted that the first row of $H_4$ corresponds to common mode signaling, which is not used herein, with the next three vectors being used to encode bits A, B, and C respectively into outputs W, X, Y, Z, these vectors also being called "modes" or "subchannels" of the Hadamard code. As the encoded outputs simultaneously carry information derived from the encoding of A, B, and C, the outputs will be a superposition or summation of modes, i.e. a sum of the sub-channel code vectors of the vector signaling code.

One familiar with the art will note that all possible values of A, B, C encoded in this manner result in mode summed values for W, X, Y, Z which are balanced; that is, summing to the constant value zero. If the mode summed values for W, X, Y, Z are scaled such that their maximum absolute value is 1 (that is, the signals are in the range +1 to −1 for convenience of description,) it will be noted that all achievable values are permutations of the vector $(+1, -\frac{1}{3}, -\frac{1}{3}, -\frac{1}{3})$ or of the vector $(-1, \frac{1}{3}, \frac{1}{3}, \frac{1}{3})$. These are called the codewords of the vector signaling code H4. As used herein, this H4 code will subsequently be called Ensemble NRZ code or ENRZ and will be used as a representative example of vector signaling code in subsequent examples, without implying limitation.

ENRZ

[Hormati I] teaches that ENRZ has optimum Inter Symbol Interference (ISI) characteristics, and [Holden I] and [Ulrich I] teach it is capable of efficient detection. As previously described, ENRZ encodes three binary data bits into a four-symbol codeword for transmission, as one example, over four wires of a transport medium. If ENRZ signaling is used over four wires of the proposed channel, the data transfer rate may be achieved with merely a 75 Gigasymbol/second signaling rate, equivalent to 112 Gbps per wire pair, for the two pair transport channel.

Duobinary encoding

Duobinary encoding is a solution known in the art in which consecutive bits of a serially transmitted data stream are processed to shape and constrain the resulting transmit data spectrum. It is well known that Inter-Symbol Interference (ISI) such as may be produced by transmission medium perturbations will result in the received amplitude of a signal in one unit interval to be perturbed by residual energy from previous unit intervals. As one example, inverted pulse reflections from a perturbation of the transmission medium will cause a received signal to be reduced by the residual influence of previously transmitted signals. Thus, a transmitter informed of this effect might combine a presently transmitted signal value with that of a previous transmission, in an attempt to anticipate or pre-compensate for this intersymbol interference effect. Thus, use of partial response codes such as duobinary are often described as a particular form of pre-equalization filtering intended to produce constructive ISI, rather than as a literal data encoding means.

As described in [Beyene], other partial-response codes are known to have comparable ISI management capabilities. For reference purposes, the characteristic equations defining these encodings or filterings are listed in Table I.

TABLE I

| Partial Response System | Characteristic Equation |
| --- | --- |
| Duobinary | $x_n + x_{n-1}$ |
| Dicode | $x_n - x_{n-1}$ |
| Modified Duobinary | $x_n - x_{n-2}$ |
| Class 2 | $x_n + 2x_{n-1} + x_{n-2}$ |

Unless otherwise described, as used herein the duobinary processing performed is assumed to be a summation of the present and immediately previous transmit unit interval signal, each scaled by a factor of 0.5. Optionally, this may be combined with a transmit lowpass filter to further control the transmit spectrum. In other embodiments, ISI-controlling encoding is combined in any order with Hadamard encoding, where the ISI-controlling encoding is any of duobinary, modified duobinary, dicode, class2, or a Hamming filter as subsequently described. In such embodiments, the ISI-controlling encoding may also be described as being performed by a partial response encoder, embodying any of the partial response encodings or filterings above.

If the characteristics of the communications channel are extremely well understood, it may be possible to configure the ISI-controlling operation of the transmitter such that no explicit complementary operation is required at the receiver, the effective action of the channel characteristics themselves serving to perform the inverse operation. Other embodiments may explicitly detect, as one example, the ternary signals produced by duobinary encoding of binary data, followed by an explicit duobinary to binary decoding operation. Alternatively, commonly used receiver ISI elimination techniques such as DFE will also efficiently address the effects of such transmitter ISI compensation. As example receivers in this document incorporate DFE, no further receiver duobinary (or other partial response code) processing will be shown.

Channelization

Physical transport channel limitations have been seen and addressed before, albeit at far lower data rates, during the efforts to provide high speed digital services over the legacy copper wire infrastructure of the telephony network. For DSL at its desired 3 Megabit data rate, a propagating signal wavelength was several hundred meters, which correlated strongly with the typical spacing of wire stubs, splices, and insulation abrasions seen in the field. Thus, an uncompensated frequency response for a typical copper telephony signal path would exhibit numerous notches and slopes caused by reflective interference among those anomalies, dissipative attenuation from degraded wires and insulation, and intrusive noise from sources such as AM radio transmitters.

Ultimately, multichannel frequency domain channelization was used to constrain the effect of those legacy transport issues. One commonly deployed Asymmetric Digital Subscriber Line (ADSL) solution, for example, partitioned the approximate 1 MHz of available transport medium bandwidth into 4.3125 kHz channels. Each channel was then independently tested for attenuation and signal-to-noise ratio, with different data throughput rates assigned to each channel depending on those test results. Thus, a channel frequency coinciding with a frequency response notch or significant external noise source would not be used, while other channels not presenting those issues could be used at full capacity. Unfortunately, the generation and detection of such a high channel count protocol relies on the availability of inexpensive digital signal processing solutions, and such technology has scaled in performance over time by perhaps a factor of ten, versus the approximate factor of 100,000 data rate increase in the present application.

Thus, although the present channel attenuation issues suggest a broadband approach may be useful, the conventional high-channel-count embodiment methods known to the art are incompatible with the anticipated data rate. A new approach specifically designed for high speed processing will be described.

Broadband Duobinary ENRZ

[Hormati III] gives examples of several embodiments combining ENRZ signaling with an additional serial transmission encoding such as Duobinary, utilizing multiple frequency-domain channels. Those examples and teachings are incorporated by reference herein, in their entirety for all purposes.

FIG. 1 is a block diagram of a further receiver embodiment that will be used to illustrate the following examples. In the receiver of FIG. 1, four communications wires w0-w3 carry a mixture of baseband and broadband signals; a first frequency channel is at baseband, i.e. comparable to a typical wire communication channel known in the art. The second frequency channel is herein called the "carrier", "carrier-modulated", or "broadband" channel, and is composed of ENRZ+duobinary signaling modulating a sinusoidal carrier, chosen to minimize the frequency overlap between spectral components of the baseband and of the carrier channel.

As in [Hormati III], a carrier frequency of 37.5 GHz is assumed. Both baseband and carrier channels run at a signaling rate of 37.5 Gsymbols/second, with a first set of three data bits being transported over the four wires of the baseband channel, and a second set of three data bits being transported over the same four wires using the carrier channel.

Other embodiments are known in which the baseband signaling rate differs from the carrier signaling rate, and/or differ from the carrier frequency. Generally speaking, however, there are implementation advantages in keeping these relationships fixed, often being expressed as ratios of small integer values, as in the 1:1:1 example provided above. As one example of such advantage, a receiver embodiment may then maintain a single local oscillator clock derived from one such received signal, and then derive the other necessary receive clocks from it through known phase lock or delay lock methods.

Filters 110 and 115 separate the received signals into a broadband component including a set of carrier-modulated symbols of a carrier-modulated codeword and a baseband component including a set of baseband symbols of a baseband codeword. For descriptive simplicity, FIG. 1 includes a High-pass filter 110 to generate the carrier-modulated symbols and a Low-pass filter 115 to generate the baseband symbols, although in practice band-pass or band-rejection filters may also be applicable. Following the baseband signal flow from the output of filter 115, so-called Multi-Input Comparators (MICs) 130 as per [Holden I] and [Ulrich I] perform weighted linear combinations of the various wire signals represented as baseband symbols, producing outputs which detect the individual subchannel data outputs of the ENRZ code. MICs 130 may additionally perform a slicing or time and amplitude sampling or measurement of each subchannel data output under control of a sampling clock provided by Clock/Data Recovery (CDR) subsystem 165.

As shown in FIG. 1, different system considerations may include different synchronization sources for CDR 165. In a first embodiment (1), a data-sampling clock is derived from data transitions of the detected subchannel data itself, using methods as described in [Hormati IV]. In a second embodiment (2), a subchannel of the ENRZ baseband signal provides a synchronization source, either by dedication to a periodic clock signal, or by augmentation of the transition density of a data stream to guarantee sufficient edge information to maintain clock synchronization. A third embodiment (3) uses a transmitted clock or synchronization signal distinct from the ENRZ data to synchronize the CDR subsystem, which may be transmitted from the transmitter to the receiver via a dedicated differential pair of wires.

As with the baseband data path, the broadband data detection path incorporates MIC-demodulation circuits 120, samplers 127, and CDR 150 functions. However, as broadband encoded data is modulated onto a carrier, simple data detection cannot be performed without addressing the carrier signal as well.

As is well understood in the art, a signal modulated on a carrier may be mixed with a demodulations signal provided by e.g., a local oscillator, to return the carrier-modulated signals to baseband (a heterodyne receiver,) or data detection may be timed relative to not only data sampling rate, but also relative to the carrier rate (a synchronous detector.) In FIG. 1, such an operation is performed by MIC-Demodulation circuits 120, as will be subsequently described. The demodulation signal may be generated by frequency multiplier 160, which in this example offered without limitation derives a carrier frequency reference from a sampling clock signal generated by baseband CDR 165. The detected subchannel information is processed using a Low Pass Filter 125, to remove residual artifacts of the heterodyne or synchronous detection operation of MIC-demodulation circuits 120. Carrier CDR subsystem 150 produces a data-sampling clock appropriate for the demodulated broadband channel data sampling 127. Depending on the particular demodulation method used by 120, Demodulation clock manager 140 may provide a demodulation signal as generated by frequency multiplier 160, a data sampling clock as provided by 150, or a combination of clocks for demodulation.

Alternative embodiments may synchronize a receiver clock to the carrier and derive other sampling clocks from that derived reference source, may synchronize a receiver clock to a detected data stream and derive other sampling clocks from that derived reference source, or utilize a combination of said methods. Synchronization may utilize a local voltage controlled oscillator (VCO) or voltage controlled delay in a phase-locked or delay-locked loop generating a local clock signal. Alternatively, synchronization may rely upon utilizing a phase comparator result that configures a phase interpolator or adjustable delay to modify the phase of a local clock signal.

Synchronously-Switched Multi-Input Demodulating Comparator

Figure 2:
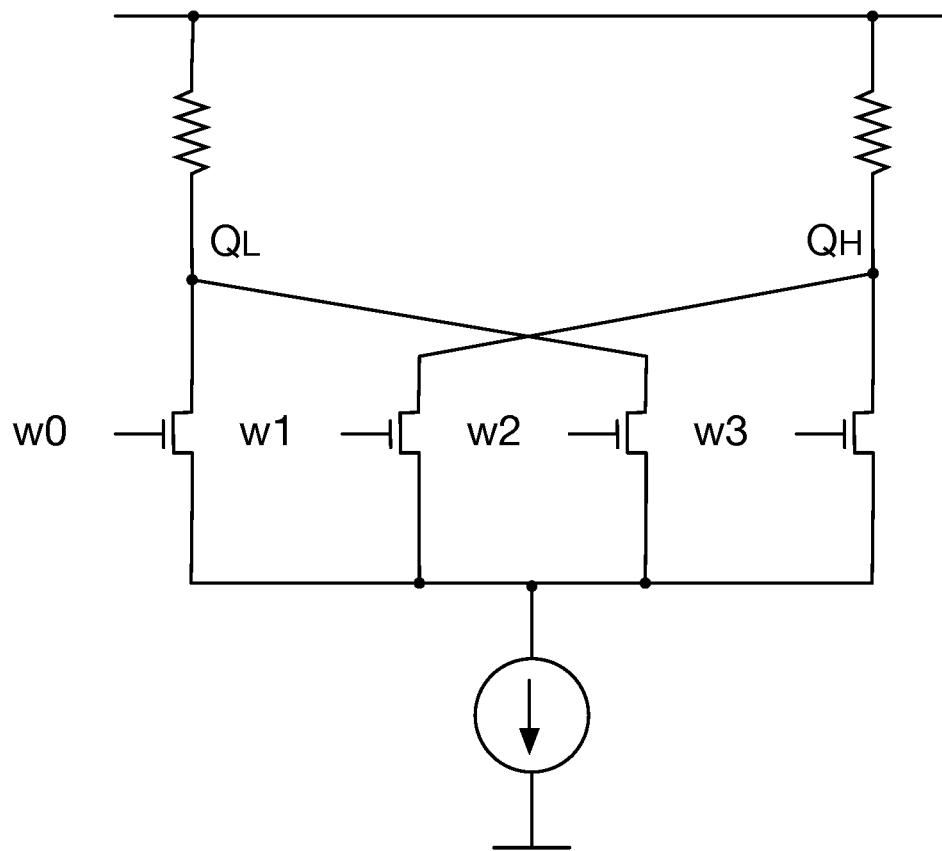
FIG. 2 is a schematic of one embodiment of a circuit detecting one ENRZ subchannel.

FIG. 2 is a schematic showing one embodiment of a linear mode ENRZ detector. Input signals w0, w1, w2, w3 are the received wire signals carrying the low-pass filtered (not shown) baseband symbols of the baseband codeword, and are connected to the transistors in accordance with a particular subchannel of the ENRZ code. That is, positive values of the subchannel vector indicate that the wire is connected to a transistor contributing to an output in a positive manner, while negative values indicate that the respective wire is connected to a transistor contributing to a negative portion of the output. Thus, in FIG. 2, the wires are connected to the transistors in accordance with the subchannel vector $[1, -1, 1, -1]$, and the differential outputs QH and QL correspond to the result of the linear combination generated by the computation $$Q = (w0+w2) - (w1+w3) \text{ (Eqn. 2)}$$

As described in [Holden I], three instances of Eqn. 2 with different permutations of the input signals efficiently detect the three subchannel data outputs of the ENRZ code. Thus, the baseband detector 130 of FIG. 1 may be composed of three instances of the circuit of FIG. 2.

Figure 3:
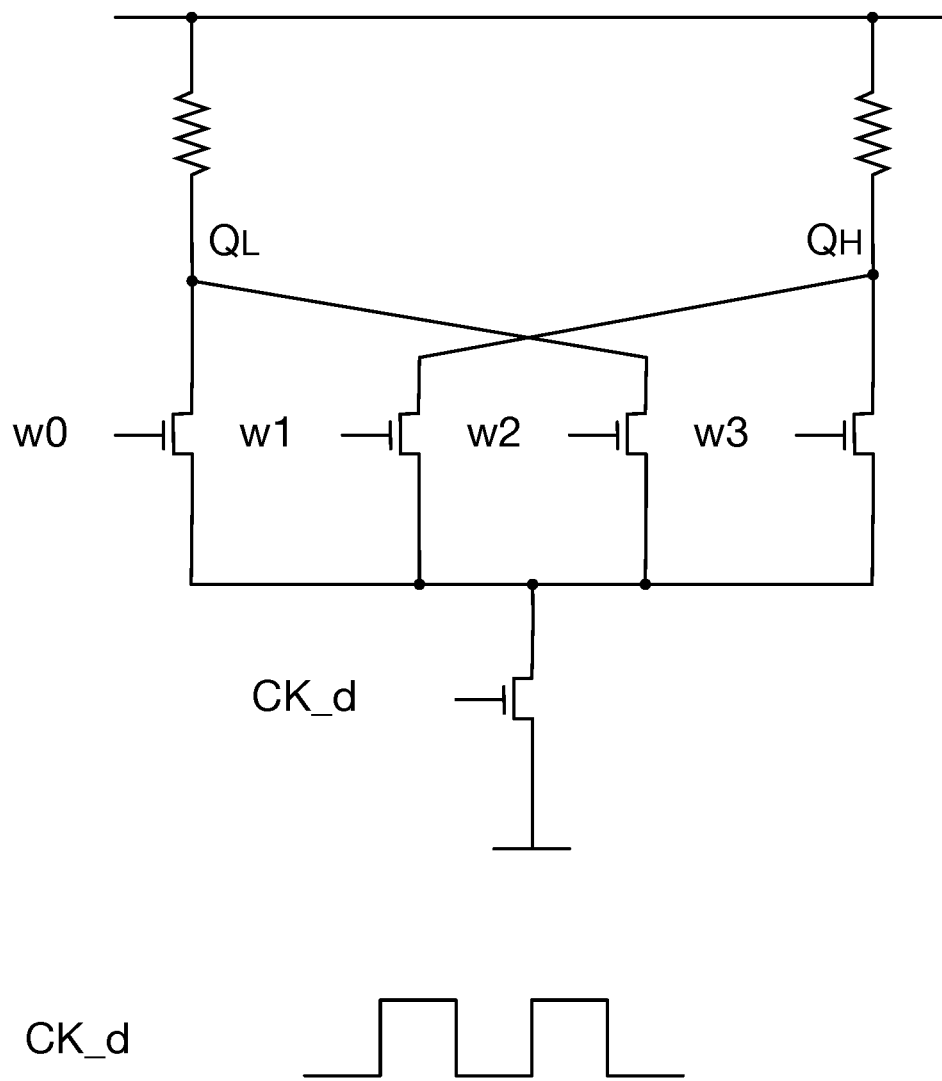
FIG. 3 is a schematic of another embodiment of a circuit detecting one ENRZ subchannel.

FIG. 3 is an embodiment of a synchronously-switched demodulating MIC circuit (also referred to herein as a "MIC-demodulation circuit") implementing the same linear combination of the MIC in FIG. 2, in which the demodulation signal CK_d operating at the carrier frequency is used to gate operation of the MIC-demodulation circuit, allowing synchronous detection of carrier-modulated symbols of the carrier-modulated codeword. In a practical embodiment, CK_d will be phase locked to the carrier frequency provided by frequency multiplier 160 in FIG. 1. As shown in FIG. 3, the MIC-demodulation circuits obtains a set of carrier-modulated symbols of a carrier-modulated codeword. Each carrier-modulated symbol may be received via a respective wire of a plurality of wires of a multi-wire bus, and may have been high-pass (or band-pass) filtered prior to being applied to a corresponding transistor of the set of transistors shown. Each transistor is connected to a respective output node of a pair of output nodes according to elements of a sub-channel vector. For example, in the example shown in FIG. 3, the set of transistors connected to wires [w0 w1 w2 w3] are connected to the pair of output nodes QL and QH according to the sub-channel vector $[1\ -1\ 1\ -1]$, which corresponds to the second row of the H4 Hadamard matrix given in Eqn. 1. The sets of transistors making up the MICs for the other two sub-channels may be connected to pairs of output nodes according to the other sub-channel vectors in the H4 Hadamard matrix that are mutually orthogonal to the $[1\ -1\ 1\ -1]$ sub-channel vector. In some further embodiments, each transistor in the set of transistors may apply a respective magnitude weight to the carrier-modulated symbol according to the sub-channel vector. Eqn. 3 below is one particular matrix that includes sub-channel vectors having various magnitudes. Magnitude weights may be applied e.g., according to relative transistor dimensions, current source magnitudes, and/or multiple equal-sized transistors connected in parallel. The conductivity of the set of transistors is synchronously switched, and is controlled according to the demodulation signal CK_d, which is operating at a frequency recovered from the carrier-modulated symbols to responsively generate a demodulated sub-channel data output as a linear combination performed according to Eqn. 2 of the set of carrier-modulated symbols, which forms a differential voltage on the pair of output nodes.

$$\begin{bmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{bmatrix} \quad \text{(Eqn. 3)}$$

Figure 4:
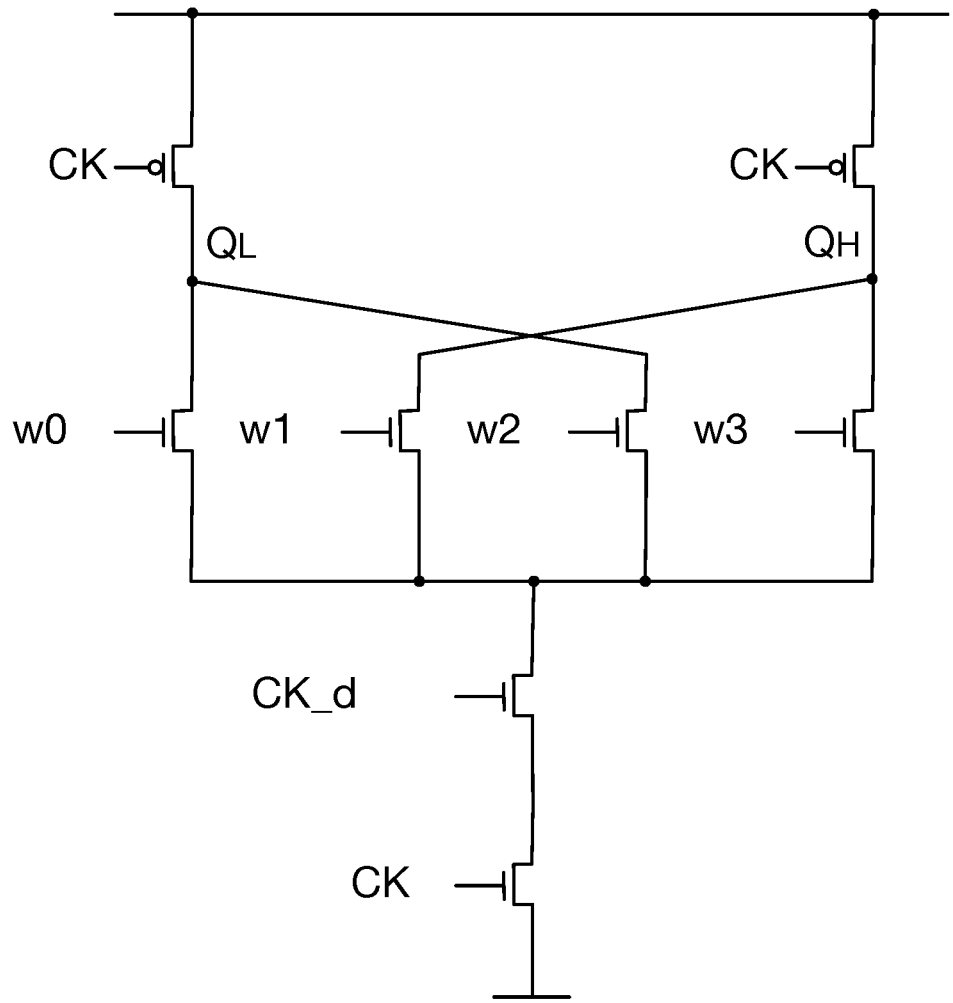
FIG. 4 is a schematic of one embodiment of a circuit detecting one carrier-modulated ENRZ subchannel.

FIG. 4 is a further embodiment of a MIC-demodulation ENRZ detector. The MIC-demodulation circuit operates in a dynamic mode, charging the node capacitance of the pair of output nodes QH and QL when a sampling clock CK operating at the symbol rate is low, and selectably providing a discharge path for those nodes through the set of input transistors to ground when CK is high. As the nodes discharge, a differential output signal corresponding to the result of Eqn. 2 is produced at output nodes QH and QL. In such an embodiment, the sampling clock simultaneously acts as the demodulation signal as the carrier-modulated symbols are demodulated and the linear combination is sliced according to the sampling clock. Such an embodiment may occur when the sampling clock rate and the carrier frequency are equal. In some alternative embodiments, as shown, synchronous switching may be achieved using a demodulation signal CK_d to periodically interrupt or gate the dynamic operation of the detector at a carrier frequency rate, allowing direct detection of signals modulating a carrier. In some such embodiments, the demodulation signal CK_d may be an integer multiple of the baseband symbol baud rate of sampling clock CK, e.g., 2×, 3×, etc. Alternatively, the demodulation signal may have a frequency that is a fraction of the sampling clock rate.

Figure 5:
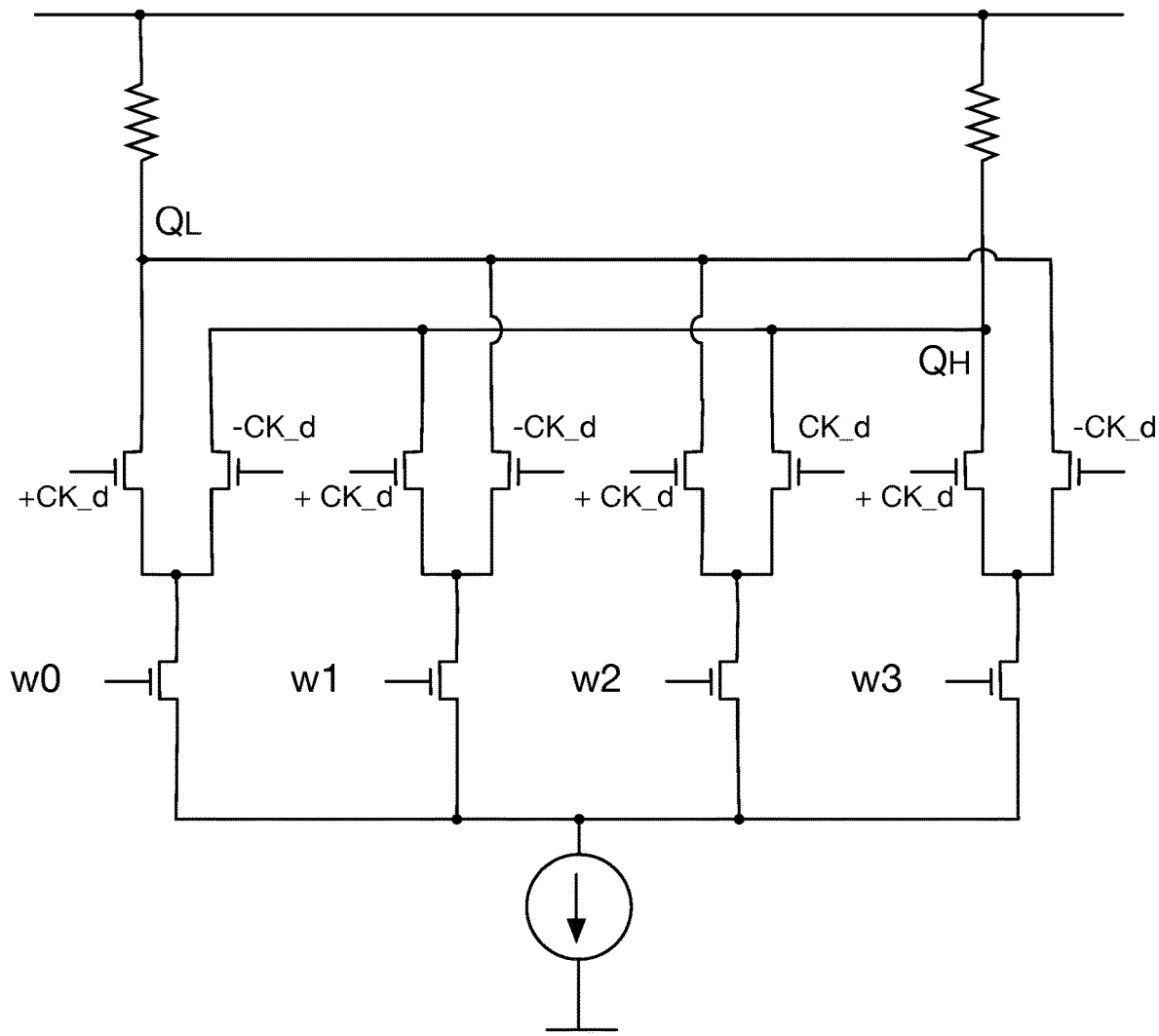
FIG. 5 is a schematic of another embodiment of a circuit detecting one carrier-modulated ENRZ subchannel.

FIG. 5 is a full-wave variation of the half-wave synchronous detector of FIG. 3. As with the half-wave detector, synchronously-switched ENRZ detection is gated by action of demodulation signal CK_d+ and its inverse or complement CK_d− which are phase locked to the carrier frequency. In an alternative embodiment, each differential pair of transistors may be composed of an NMOS device and a PMOS device that both receive the same demodulation signal CK_d+. In this full-wave circuit variation, the contribution of each input to the pair of output nodes is steered on alternating half cycles of the clock to the inverting and non-inverting result outputs, effectively doubling the output signal and substantially reducing the need for output filtering. The steering is performed by a plurality of differential pairs of transistors connected to the pair of output nodes for selectably connecting each transistor of the set of transistors to a respective output node according to the demodulation signal and its inverse. As shown, the set of transistors receiving the carrier-modulated symbols are alternately connected between the pair of output nodes via respective differential pairs of transistors. For each sub-channel MIC, the differential pairs of transistors may be connected according to the respective sub-channel vector of the plurality of mutually orthogonal sub-channel vectors. In the case of FIG. 5, the differential pairs of transistors are connected to the pair of output nodes according to the sub-channel vector [1 −1 1 −1].

Figure 6:
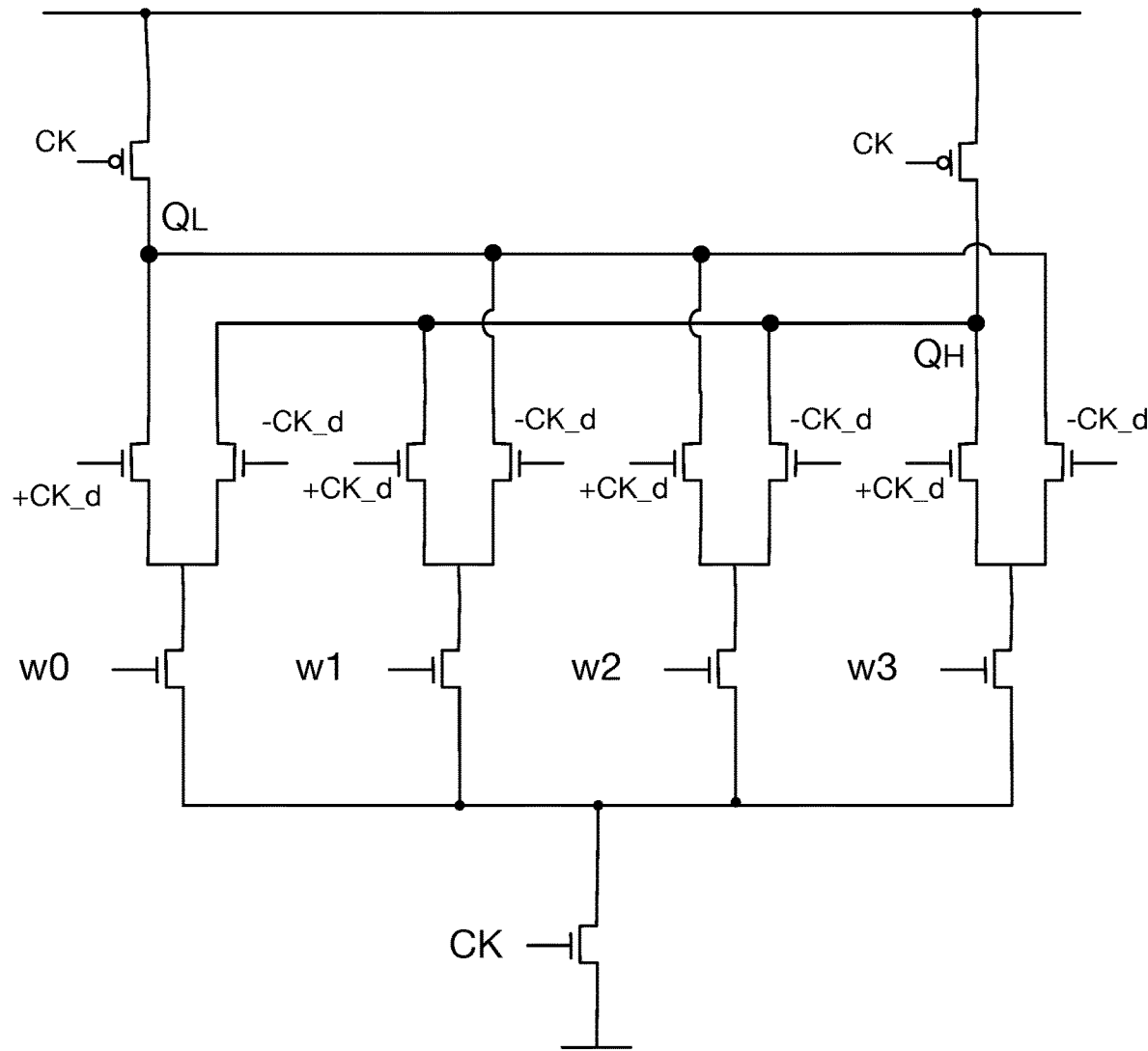
FIG. 6 is a schematic of a further embodiment of a circuit detecting one carrier-modulated ENRZ subchannel.

FIG. 6 illustrates a discrete full-wave variation of the discrete half-wave dynamic synchronous detector of FIG. 4. Sampling clock CK controls the dynamic charge/discharge operation of the circuit, while demodulation signal CK_d+ and its complement CK_d− gate detection to be synchronous with the carrier frequency, as described above.

In the examples of FIGS. 4 and 6, the timing of the two clock signals may be coordinated so as to be compatible with the dynamic circuit operation. Specifically, in FIG. 4 a pre-charge operation occurring when clock CK is low may precede each discharge or integration cycle occurring when clocks CK_d and CK are both high. In FIG. 6, a full cycle of clock CK (i.e. a pre-charge cycle and a discharge cycle) may occur for each half-cycle of CK_d. Alternatively, the integration time for the circuit may be long enough to encompass two or more half-cycles of CK_d. In a further alternative embodiment, the demodulation signal CK_d+/− may be an integer multiple of CK. In such embodiments, multiple cycles of CK_d essentially gate the signal into or out of the integration period. In such embodiments, the pair of output nodes are pre-charged according to the sampling clock, and the pair of output nodes are only discharged when the carrier-modulated symbols at the inputs of the transistors have the correct polarity. In the full-wave embodiment, the pair of output nodes are always discharged, but the connections of the set of transistors receiving the carrier-modulated symbols to the pair of output nodes is alternated according to the demodulation signal as the carrier-modulated symbols alternate according to the modulation.

Figure 7:
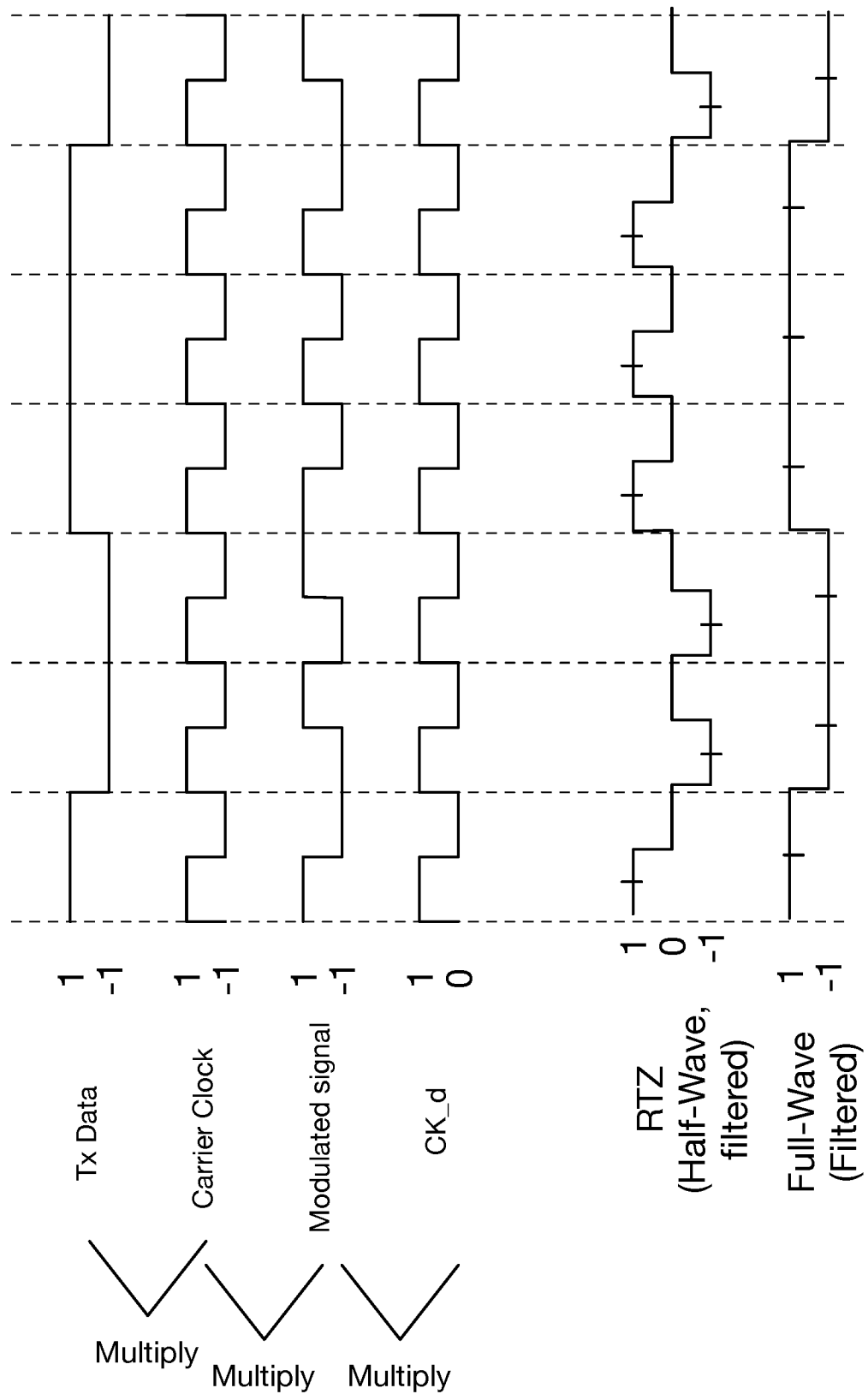
FIG. 7 illustrates waveforms for the carrier-modulated data encoding and decoding operations.

Operation of the half-wave and full-wave synchronous detectors is illustrated in the waveforms of FIG. 7. As described in [Hormati III], a transmitter multiplies Transmit Data and a Carrier-rate clock to produce a carrier-modulated signal. A receiver locally generates a carrier-rate demodulation clock, which is combined with the received signal in a synchronous detector to produce a detectable receive data signal. The carrier-modulated signal is encoded into carrier-modulated symbols of a carrier-modulated codeword and transmitted over the wires of the multi-wire bus.

The illustrated Return-to-Zero (RTZ) waveform in FIG. 7 is one example of an output of a half-wave detector circuit, while the Full-wave waveform is one example of an output of a full-wave detector circuit. In some embodiments, both such outputs are low-pass filtered to aid in reconstituting the detected waveform and eliminating spurious signal artifacts. Each waveform may then be sampled in the center of the data interval, as illustrated by the vertical hash marks.

Figure 8A:
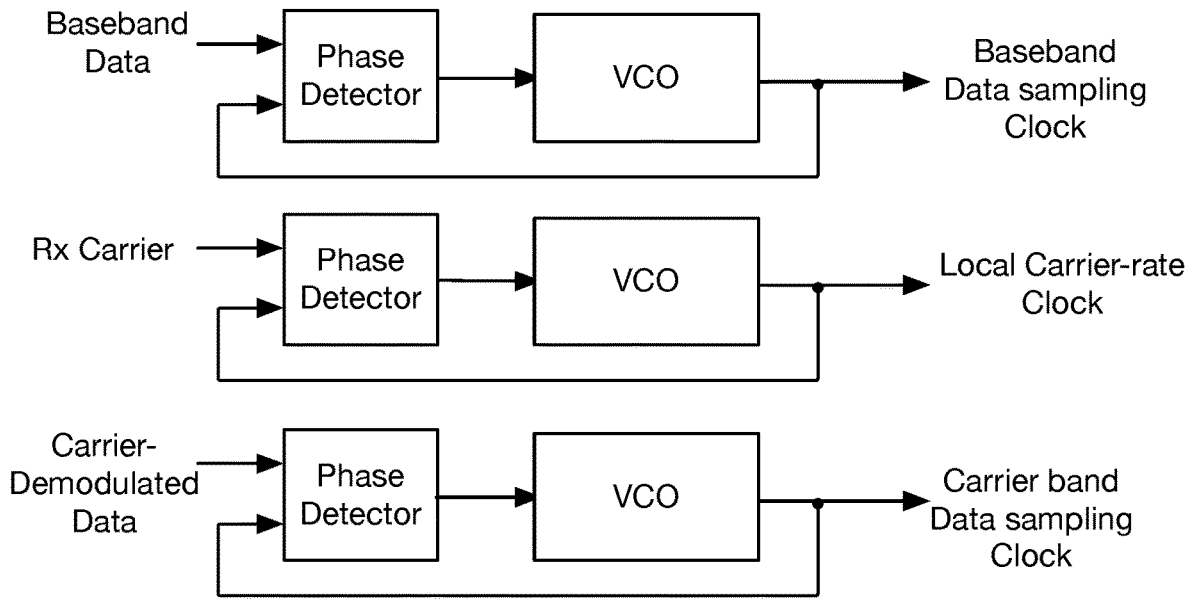
FIGS. 8A and 8B illustrate alternative embodiments for receiver clock generation.

FIG. 8A is a block diagram illustrating a conventional multiple PLL approach to generating the necessary receive clocks for an embodiment such as shown in FIG. 1. Using information obtained directly or indirectly from the received data (which may include transmitted clocks via dedicated wires, a dedicated sub-channel, and/or enhanced edge transition density, eye width or edge measurement, etc.) appropriately-timed sampling clocks are generated to permit optimum sampling of detected baseband data. This is commonly known as Clock-Data Alignment or Clock-Data Recovery (CDA or CDR). In common embodiments, a PLL configuration is used in which a phase detector controls a Voltage Controlled Oscillator (VCO) so as to generate a local clock signal having the desired characteristics.

Separately, an independent PLL configuration generates a local clock signal aligned to the carrier frequency of the received carrier-demodulated data, and a sampling clock suitable for optimum sampling of carrier-demodulated data.

Figure 8B:
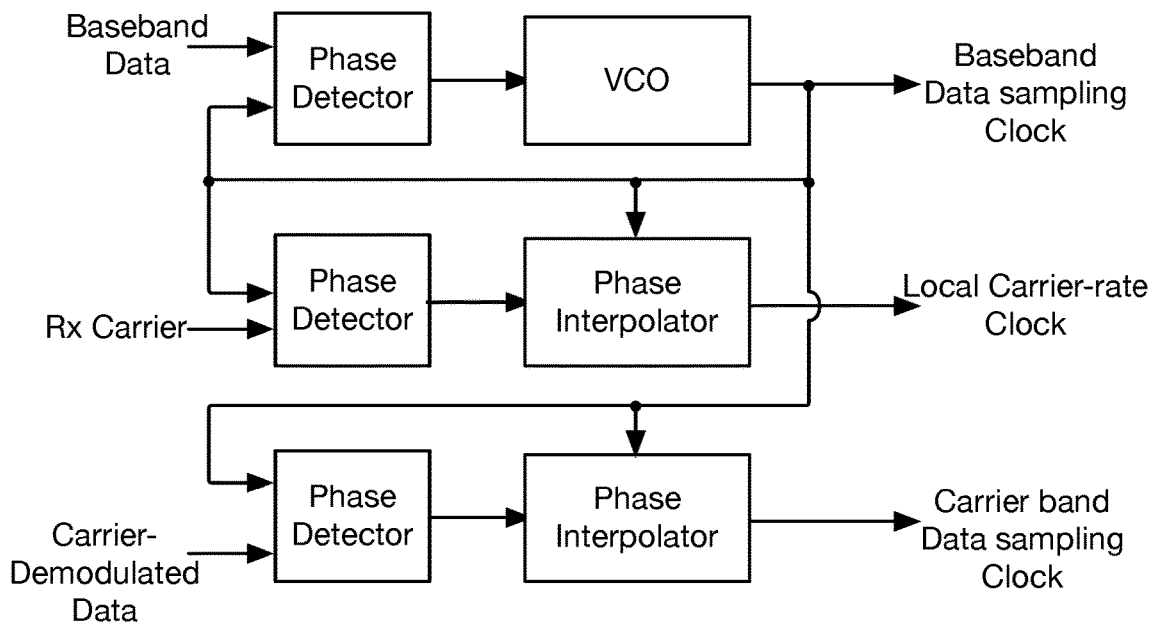

In an alternative embodiment, one or more of the necessary local clock signals may be derived from another clock signal. FIG. 8B illustrates a local clock signal created using a PLL locked to a reference derived from the Baseband Data. This may be facilitated by, as representative examples, the Baseband data incorporating a dedicated clock signal, or being augmented by a guaranteed density of edge transitions. This well-controlled and stable local clock may then be used to generate other local clock signals, either by well-known frequency division or multiplication (e.g., using frequency multiplier 160 of FIG. 1), or simply by adjusting the relative phase of the derived clock using a phase interpolator or adjustable delay element (e.g., using offset correction element 140). For example, the local clock signal derived from baseband data may have the same frequency as the carrier frequency, and may thus be phase-adjusted using a phase detector and phase interpolator to generate the demodulation signal. Further, if the data rate of the demodulated sub-channel data is equal to the data rate of the baseband data, the clock derived from the baseband data may drive generation of the sampling clock for the demodulated sub-channel data, and may be phase-shifted accordingly. In some embodiments, the carrier frequency is different than the data rate of the baseband data, and thus the sampling clock generated from the baseband data may be multiplied/divided (not shown) to generate a demodulation signal having the carrier frequency (as is the case shown in FIG. 1). The demodulation signal may then be phase-detected and phase-shifted to be aligned to the carrier-modulated symbols. FIG. 8B shows two such derived clocks, each being phase-adjusted by a separate phase detector and phase interpolator. In some embodiments, the phase-adjustments are made to compensate for differences in the signal paths for the baseband/carrier signals, as they undergo different filtering, etc.

In some embodiments, hybrid clock generation embodiments are also possible, including embodiments utilizing secondary or slave PLLs that produce a second local clock that is derived from a first local clock generated as described above. In such a system configuration, the secondary PLL may have different lock characteristics than the primary PLL, allowing independent optimization of characteristics such as lock time, free-running drift, jitter, etc.

Figure 9:
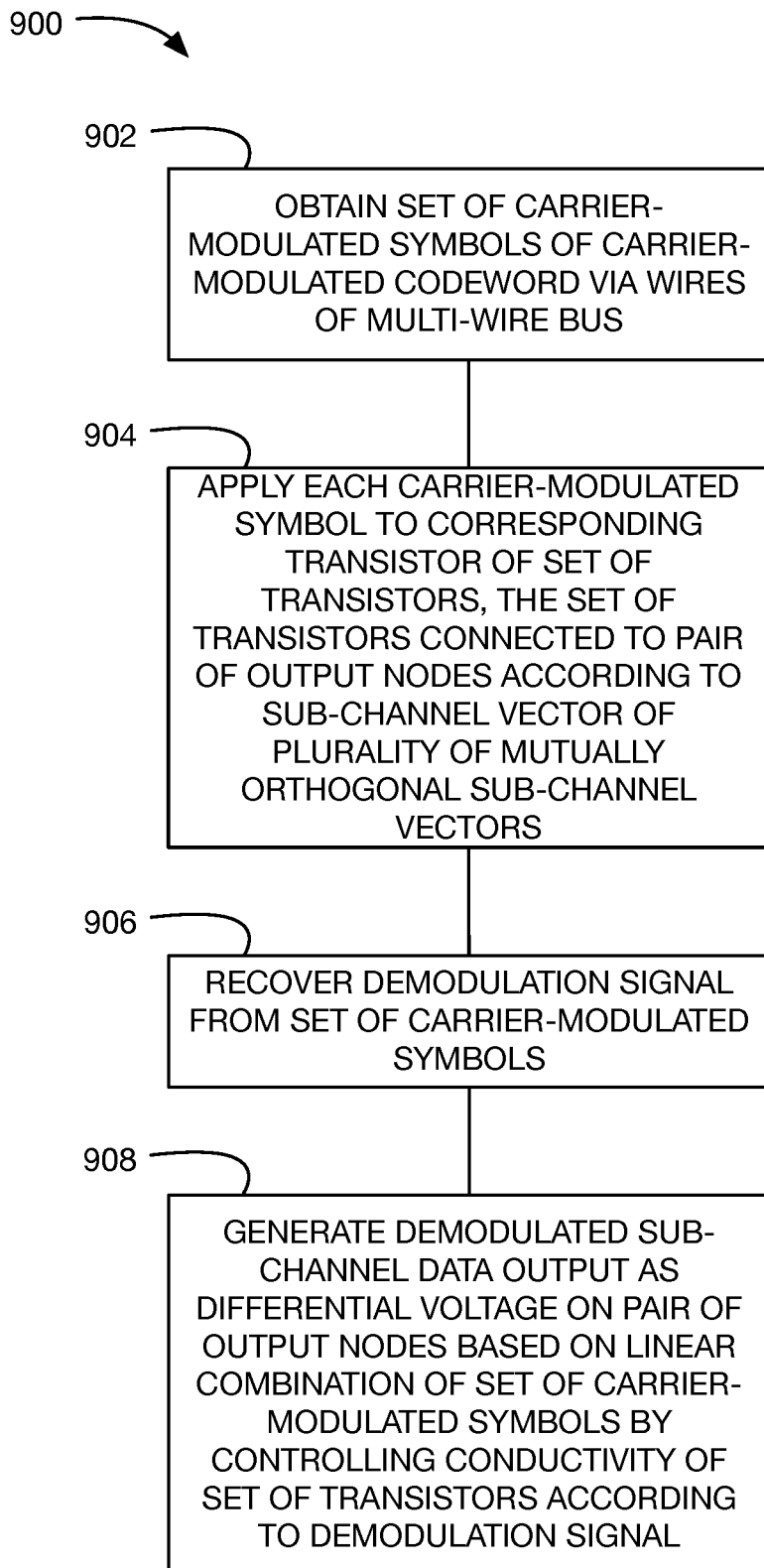
FIG. 9 is a flowchart of a method, in accordance with some embodiments.

FIG. 9 is a flowchart of a method 900, in accordance with some embodiments. As shown, method 900 includes obtaining 902 a set of carrier-modulated symbols of a carrier-modulated codeword, each carrier-modulated symbol received via a respective wire of a plurality of wires of a multi-wire bus. Each carrier-modulated symbol of the set of carrier-modulated symbols is applied 904 to a corresponding transistor of a set of transistors, the set of transistors connected to a pair of output nodes according to a sub-channel vector of a plurality of sub-channel vectors. A demodulation signal CK_d is recovered 906 from the set of carrier-modulated symbols. A demodulated sub-channel data output is generated 908 as a differential voltage on the pair of output nodes based on a linear combination of the set of carrier-modulated symbols by controlling a conductivity of the set of transistors according to the demodulation signal CK_d.

In some embodiments, controlling the conductivity of the set of transistors includes selectably enabling a current source according to the demodulation signal CK_d, as shown in FIGS. 3 and 4. In such embodiments, the demodulated sub-channel data output is a return-to-zero (RTZ) signal, as illustrated in FIG. 7.

In some embodiments, controlling the conductivity further includes alternately connecting each transistor of the set of transistors between the pair of output nodes according to the demodulation signal. In such embodiments, each transistor circuit is alternately connected between the pair of output nodes using a respective differential pair of transistors connected to the pair of output nodes according to the sub-channel vector. In some embodiments, the respective differential pair of transistors receives the demodulation signal and a complement of the demodulation signal and is composed of same-type transistors (e.g., NMOS or PMOS only), while alternative embodiments may include differential pairs of transistors that include an NMOS and a PMOS transistor both receiving the demodulation signal CK_d. Such a configuration is illustrated in FIGS. 5 and 6, as the differential pairs receiving the demodulation signal CK_d+ and a complement of the demodulation signal CK_d− alternate the connection of the corresponding transistor connected to the carrier-modulated symbols between each output node in accordance with the polarity of the carrier-modulated symbols.

In some embodiments, the conductivity of each transistor of the set of transistors is further controlled by a symbol value of the applied carrier-modulated symbol. In such embodiments, the amount of current drawn through each transistor is proportional to the symbol value applied at each transistor. Signal amplitudes in one particular embodiment are:

500 mV center,

500+180=680 mV (+1)

500−60=440 mV (−⅓)

500−60=440 mV (−⅓)

500−60=440 mV (−⅓)

where a symbol of magnitude '1' corresponds to a 180 mV deviation from the 500 mV center voltage and a symbol of magnitude '⅓' corresponds to a 60 mV deviation from the 500 mV center voltage.

In some embodiments, the method further includes pre-charging the pair of output nodes in response to a sampling clock, and wherein the conductivity of the set of transistors is further controlled according to the sampling clock. Such embodiments are referred to above as "discrete" or "dynamic" MIC-demodulation circuits.

In some embodiments, the differential voltage on the pair of output nodes is formed by drawing currents through impedance elements connected to the pair of output nodes. In some embodiments, the impedance elements may be resistors connected between a power supply and the pair of output nodes to control a voltage drop across the resistors. The differential amount of current drawn through the resistors will form a differential voltage output on the pair of output nodes.

In some embodiments, the method further includes low-pass filtering the demodulated sub-channel data output.

In some embodiments, obtaining the set of carrier-modulated symbols includes high-pass filtering a superposition codeword comprising the set of carrier-modulated symbols of the carrier-modulated codeword and a set of baseband symbols of a baseband codeword.

In some embodiments, the sub-channel vector is part of a plurality of mutually orthogonal sub-channel vectors that compose rows of an orthogonal matrix. In some such embodiments, the orthogonal matrix is a Hadamard matrix.

In some embodiments, the demodulation signal has an equal rate as a sampling clock associated with a baud rate of the data streams. In alternative embodiments, the demodulation signal has a differing rate than the sampling clock. In some such embodiments, the demodulation signal may be an integer multiple of the sampling clock, and may initiate multiple discharge periods in a single unit interval. Alternatively, the demodulation signal may be a fraction of the sampling clock. In such embodiments, the sampling clock may initiate multiple pre-charge/discharge cycles in a half cycle of the demodulation signal. In some embodiments, the demodulation signal is generated by multiplying the sampling clock using a frequency multiplier. Alternatively, the demodulation signal may be generated by dividing the sampling clock using a frequency divider.

The invention claimed is:

1. A method comprising:
receiving wire signals comprising a superposition of a set of baseband symbols and a set of carrier-modulated symbols;
generating, using a set of baseband multi-input comparators (MICs) a set of baseband sub-channel outputs by combining the set of wire signals according to the respective input permutations associated with respective sub-channel vectors of a plurality of mutually orthogonal sub-channel vectors;
obtaining a phase-adjusted demodulation signal associated with the set of carrier-modulated symbols; and
generating, using a set of combined MIC-demodulation circuits, a set of demodulated sub-channel outputs by combining the set of wire signals according to the respective input permutations, and according to the phase-adjusted demodulation signal operating to control a polarity of the respective input permutation to match a polarity of the set of carrier-modulated symbols.

2. The method of claim 1, wherein the baseband sub-channel outputs are sampled using a baseband clock signal.

3. The method of claim 2, further comprising deriving the phase-adjusted demodulation signal from the baseband clock signal by frequency-multiplying the baseband clock signal to achieve a frequency equal to a carrier frequency associated with the set of carrier-modulated symbols.

4. The method of claim 2, further comprising deriving the phase-adjusted demodulation signal from the baseband clock signal by frequency-dividing the baseband clock signal to achieve a frequency equal to a carrier frequency associated with the set of carrier-modulated symbols.

5. The method of claim 2, wherein a frequency of the baseband clock signal is equal to a carrier frequency associated with the set of carrier-modulated symbols.

6. The method of claim 5, further comprising deriving the phase-adjusted demodulation signal by phase-adjusting the baseband clock signal to be aligned to the set of carrier-modulated symbols.

7. The method of claim 1, wherein generating each demodulated sub-channel output comprises forming a differential voltage at a pair of output nodes of the combined MIC-demodulation circuit, the differential voltage generated by drawing a differential current through a pair of load resistors.

8. The method of claim 1, wherein generating each demodulated sub-channel output comprises initializing a pair of output nodes with a predetermined amount of charge according to a first cycle of a sampling clock, and generating a differential current through the initialized pair of output nodes responsive to a second cycle of the sampling clock.

9. The method of claim 1, further comprising low-pass filtering the set of demodulated sub-channel outputs.

10. The method of claim 1, wherein the plurality of mutually-orthogonal sub-channel vectors correspond to rows of a Hadamard matrix.

11. An apparatus comprising:
a set of input transistors configured to receive a set of wire signals according to respective input permutation associated with a respective sub-channel vector of a plurality of mutually-orthogonal sub-channel vectors, the set of wire signals comprising a superposition of a set of baseband symbols and a set of carrier-modulated symbols;
a combined multi-input comparator (MIC)-demodulation circuit configured to obtain a phase-adjusted demodulation signal associated with the set of carrier-modulated symbols, and to generate a demodulated sub-channel output on a pair of output nodes by combining the set of wire signals according to the respective input permutation, and according to the phase-adjusted demodulation signal operating to control a polarity of the respective input permutation to match a polarity of the set of carrier-modulated symbols.

12. The apparatus of claim 11, further comprising a MIC configured to generate a baseband sub-channel output; and
a sampler configured to sample the baseband sub-channel output using a baseband clock signal.

13. The apparatus of claim 12, further comprising a clock recovery circuit configured to derive the phase-adjusted demodulation signal from the baseband clock signal by frequency-multiplying the baseband clock signal to achieve a frequency equal to a carrier frequency associated with the set of carrier-modulated symbols.

14. The apparatus of claim 12, further comprising a clock recovery circuit configured to derive the phase-adjusted demodulation signal from the baseband clock signal by frequency-dividing the baseband clock signal to achieve a frequency equal to a carrier frequency associated with the set of carrier-modulated symbols.

15. The apparatus of claim 12, wherein a frequency of the baseband clock signal is equal to a carrier frequency associated with the set of carrier-modulated symbols.

16. The apparatus of claim 15, further comprising a clock recovery circuit configured to derive the phase-adjusted demodulation signal by phase-adjusting the baseband clock signal to be aligned to the set of carrier-modulated symbols.

17. The apparatus of claim 11, further comprising load resistors connected to the pair of output nodes, and wherein the demodulated sub-channel output is generated by drawing a differential current through the load resistors according to the phase-adjusted demodulation signal.

18. The apparatus of claim 11, further comprising pre-charging transistors configured to initialize the pair of output nodes with a predetermined amount of charge according to a first cycle of a sampling clock, and an integrating transistor configured to generate a differential current through the initialized pair of output nodes responsive to a second cycle of the sampling clock.

19. The apparatus of claim 11, further comprising a low-pass filter configured to filter the demodulated sub-channel output.

20. The apparatus of claim 11, wherein the plurality of mutually-orthogonal sub-channel vectors correspond to rows of a Hadamard matrix.

* * * * *